(12) United States Patent
Kawano et al.

(10) Patent No.: US 7,330,613 B2
(45) Date of Patent: Feb. 12, 2008

(54) WAVEGUIDE TYPE OPTICAL DEVICE

(75) Inventors: Kenji Kawano, Atsugi (JP); Masaya Nanami, Zama (JP); Makoto Saito, Atsugi (JP); Toru Nakahira, Atsugi (JP); Yuji Sato, Atsugi (JP); Seiji Uchida, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 10/565,404

(22) PCT Filed: Jun. 8, 2005

(86) PCT No.: PCT/JP2005/010508

§ 371 (c)(1),
(2), (4) Date: Jan. 23, 2006

(87) PCT Pub. No.: WO2006/001172

PCT Pub. Date: Jan. 5, 2006

(65) Prior Publication Data

US 2006/0274991 A1 Dec. 7, 2006

(30) Foreign Application Priority Data

Jun. 29, 2004 (JP) ............................. 2004-190970
Dec. 27, 2004 (JP) ............................. 2004-378265

(51) Int. Cl.
*G02B 6/12* (2006.01)
(52) U.S. Cl. ......................................... 385/14; 385/31
(58) Field of Classification Search .................. 385/39, 385/50
See application file for complete search history.

(56) References Cited

U.S. PATENT DOCUMENTS 5,613,026 A    3/1997  Nagata et al.
(Continued)

FOREIGN PATENT DOCUMENTS

JP          3-103805 A        4/1991
(Continued)

OTHER PUBLICATIONS

Kenji Kawano; "Basis and Application of Optical Coupling System for Optical Devices"; Second Edition, Gendai Kogakusha, Jun. 1998, p. 45 and 168.

(Continued)

*Primary Examiner*—Sarah Song
(74) *Attorney, Agent, or Firm*—Frishauf, Holtz, Goodman & Chick, P.C.

(57) ABSTRACT

A waveguide type optical device has an optical waveguide formed on a substrate, functional optical waveguide an optical input end face and an optical output end face which are provided to respective substrate end faces an input optical waveguide connecting the optical input end face and the functional optical waveguides, an output optical waveguide connecting the optical output end face and the functional optical waveguides, and a signal light monomode optical fiber. The input optical waveguide and the output optical waveguide is formed so as to form angles other than 0° with the functional optical waveguides at the optical input end face and the optical output end face respectively, such that an angle between each of the input optical waveguide and the output optical waveguide with respect to a corresponding one of the substrate end faces is other than 90°.

21 Claims, 11 Drawing Sheets

U.S. PATENT DOCUMENTS

| | | |
|---|---|---|
| 5,727,105 A | 3/1998 | Nagata et al. |
| 5,999,667 A | 12/1999 | Castoldi |
| 2003/0147591 A1* | 8/2003 | Doi et al. .................. 385/39 |

FOREIGN PATENT DOCUMENTS

| | | |
|---|---|---|
| JP | 4-350804 A | 12/1992 |
| JP | 7-198997 A | 8/1995 |
| JP | 8-114723 A | 5/1996 |
| JP | 8-261713 A | 10/1996 |
| JP | 8-271215 A | 10/1996 |
| JP | 10-274759 A | 10/1998 |
| JP | 11-167035 A | 6/1999 |
| JP | 2000-131658 A | 5/2000 |
| JP | 2000-223793 A | 8/2000 |
| JP | 2003-207664 A | 7/2003 |

OTHER PUBLICATIONS

International Preliminary Report on Patentability, Chapter I of the Patent Cooperation Treaty for PCT/JP2005/010508, 8 sheets.

* cited by examiner

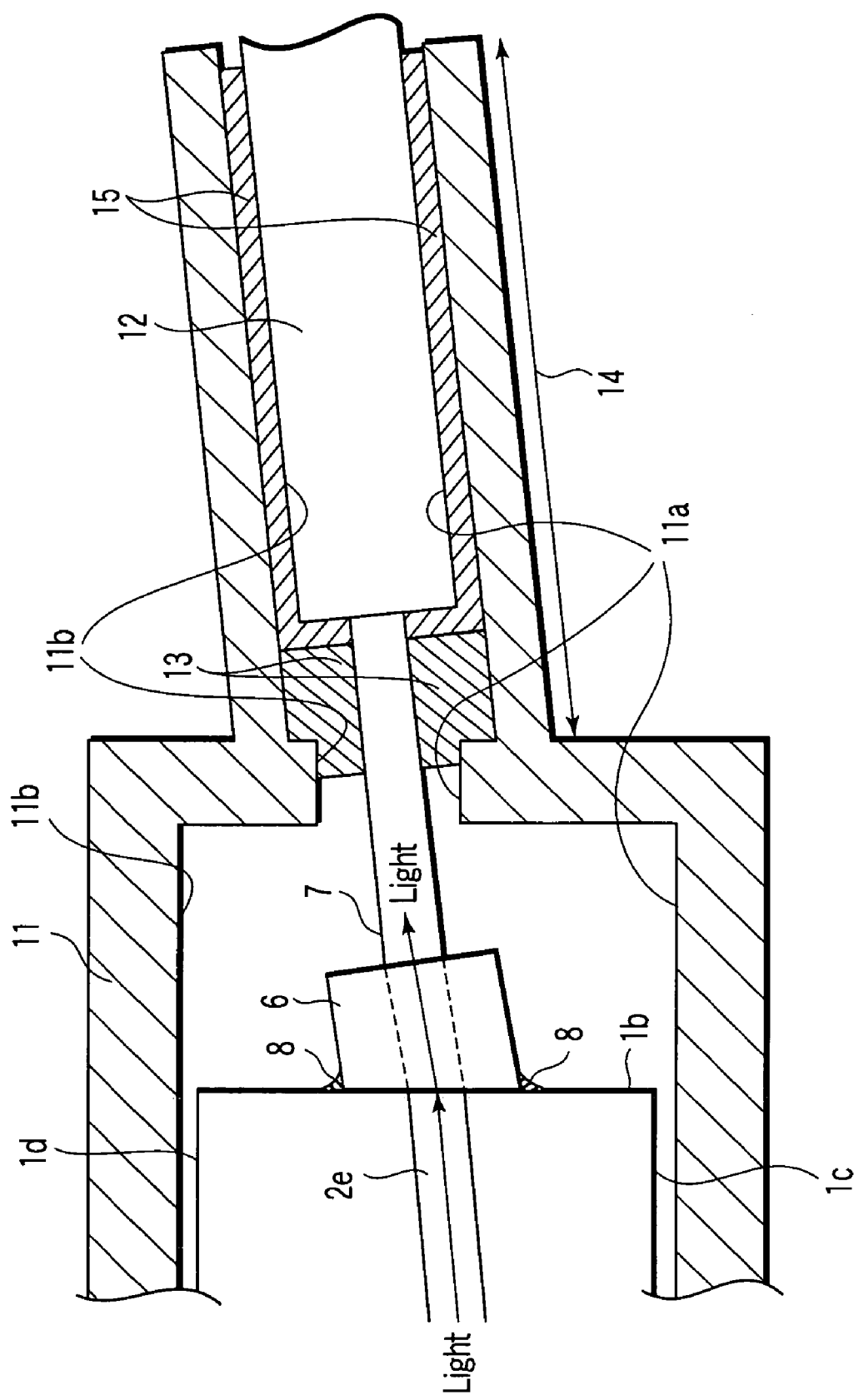
F I G. 6

WAVEGUIDE TYPE OPTICAL DEVICE

This application is a U.S. National Phase Application under 35 USC 371 of International Application PCT/JP2005/010508 filed Jun. 8, 2005.

TECHNICAL FIELD

The present invention relates to a waveguide type optical device, and in particular, to a compact and low-loss waveguide type optical device.

BACKGROUND ART

As is commonly known, a traveling-wave electrode lithium niobate optical modulator (hereinafter, which will be abbreviated as an LN optical modulator) in which an optical waveguide and a traveling-wave electrode are formed on a substrate, such as lithium niobate ($LiNbO_3$), having so-called electro-optic effect that a refractive index is varied by impressing electric field in an optical modulator which is a waveguide type optical device (hereinafter, a lithium niobate substrate is abbreviated as an LN substrate) is applied to a large-volume optical transmission system of 2.5 Gbits/s and 10 Gbits/s due to the excellent chirping characteristic.

Such an LN optical modulator is recently under review so as to be further applied to an extra-large volume optical transmission system of 40 Gbits/s, and is expected as a key device in a large-volume optical transmission system.

FIG. 7 is a top view showing a structure of an LN optical modulator according to a prior art.

In FIG. 7, reference numeral 1 is a parallelogram z-cut LN substrate, reference numerals 1a and 1b are substrate end faces which are the ends in a longitudinal direction of the substrate 1, and reference numerals 1c and 1d are substrate side faces which are the ends in a short-side direction of the substrate 1.

Further, in FIG. 7, reference numeral 2 is a Mach-Zehnder type optical waveguide formed by carrying out thermal diffusion onto Ti, reference numeral 2a is an input optical waveguide, reference numeral 2b is a Y-branch type branched optical waveguide, reference numeral 2c-1 and reference numeral 2c-2 are functional optical waveguides, reference numeral 2d is a Y-branch type coupled-wave optical waveguide, and reference numeral 2e is an output optical waveguide.

Further, in FIG. 7, reference numeral 2f is an optical input end face of the input optical waveguide 2a, reference numeral 2g is an optical output end face of the output optical waveguide 2e, reference numeral 3 is an electric signal source, reference numeral 4 is a central electrode of a traveling-wave electrode, reference numerals 5a and 5b are earth electrodes, reference numeral 6 is a glass capillary, and reference numeral 7 is a signal light monomode optical fiber.

Further, in FIG. 7, an imaginary line of reference numeral 11 denotes a package case, and reference numerals 11a and 11b denote side faces at respective top and bottom sides of the package case 11.

Note that, as not illustrated in FIG. 7, a glass capillary and a monomode optical fiber are fixed to the optical input end face 2f at the input optical waveguide 2a side in order to input a light to the input optical waveguide 2a in an actual LN optical modulator.

In this LN optical modulator in accordance with the prior art, a light wave-guided through the functional optical waveguides 2c-1 and 2c-2 is interacted with an electric signal impressed from the electric signal source 3.

Namely, as a result of carrying out phase modulation onto the electric signal impressed from the electric signal source 3 such that the phases of a light wave-guided through the functional optical waveguides 2c-1 and 2c-2 are made to be codes opposite to one another via the central conductor 4 of the traveling-wave electrode and the earth electrodes 5a and 5b, the light receives phase modulation by which the codes are made opposite to one another at the portions of the functional optical waveguides 2c-1 and 2c-2.

FIGS. 8A and 8B are views showing a state in which the signal light monomode optical fiber 7 has been fixed to the glass capillary 6, wherein FIG. 8A is a front view thereof, and FIG. 8B is a top view thereof.

FIG. 9 shows a mounting state in which the glass capillary 6 to which the signal light monomode optical fiber 7 has been fixed is fixed to the end face 1b of the z-cut LN substrate 1.

Here, in FIG. 9, reference numeral 8 is an UV cure adhesive becoming hardened by irradiating ultraviolet radiation thereto.

Note that the UV cure adhesive 8 has seeped into the end face 1b of the z-cut LN substrate 1, the glass capillary 6, and the end face of the signal light monomode optical fiber 7 as well.

As known from FIGS. 8A, 8B, and 9, with respect to the end face 1b of the z-cut LN substrate 1, the glass capillary 6, and the end face of the signal light monomode optical fiber 7, a light from the output optical waveguide 2e is reflected at the substrate end face 1b (to be exact, the optical output end face 2g formed at the substrate end face 1b). In order to avoid the reflected light from being coupled to the output optical waveguide 2e again, i.e., in order to remove the reflected return light, the substrate end face 1b is cut at a slant.

Hereinafter, in order to simplify the description, as shown in FIG. 9, it is suppose that the output optical waveguide 2e is in parallel with the side faces 1c and 1d of the z-cut LN substrate 1 (or the package case side faces 11a and 11b).

FIG. 10 shows the situation that a light is refracted at the substrate end face 1b of the z-cut LN substrate 1 of FIG. 7 (to be exact, it is the optical output end face 2g formed at the substrate 1b. However, to be simple, it will be inscribed as the substrate end face 1b hereinafter).

It is assumed that the output optical waveguide 2e is in parallel with the substrate side faces 1c and 1d (or the package case side faces 11a and 11b). Thus, the end face 1b of the z-cut LN substrate 1 is inclined at only $\theta_0$ to the perpendicular line with respect to the side faces 1c and 1d of the z-cut LN substrate 1 (or the perpendicular line with respect to the package case side faces 11a and 11b).

Note that, in other words, $\theta_0$ is an angle formed by a perpendicular line 10 with respect to the end face 1b of the z-cut LN substrate 1 and a light propagating through the output optical waveguide 2e.

Here, $n_{LN}$ is an equivalent refractive index of the output optical waveguide 2e.

Note that a refractive index of the UV cure adhesive 8 and an equivalent refractive index of the signal light monomode light fiber 7 are expressed as n on the assumption that those are equivalent to one another.

The light propagating through the output optical waveguide 2e is refracted by Snell's law at the end face 1b of the z-cut LN substrate 1 (as described above, to be exact, although it is the optical output end face 2g formed at the substrate end face 1b, in order to simplify, it will be described as the substrate end face 1b hereinafter)

Here, suppose that an angle formed by the light propagating while being refracted at the end face of the z-cut LN substrate 1 is Θ.

In FIG. 10, Δθ(=Θ−θ₀) is an angle formed by the light refracted at the substrate end face 1*b* and the line parallel to the side faces 1*c* and 1*d* of the z-cut LN substrate 1 (or the package case side faces 11*a* and 11*b*).

As can be understood from FIG. 10, the output optical waveguide 2*e* is designed so as to be parallel to the side faces 1*c* and 1*d* of the z-cut LN substrate 1 (or the package case side faces 11*a* and 11*b*) in general. For this reason, Δθ of the light refracted on the basis of Snell's law at the substrate end face 1*b* inclined at an angle of θ to the perpendicular line with respect to the side faces 1*c* and 1*d* of the z-cut LN substrate 1 or the perpendicular line with respect to the package case side faces 11*a* and 11*b* is not made 0.

Namely, the light refracted at the substrate end face 1*b* propagates at an angle of Δθ to the line parallel to the side faces 1*c* and 1*d* of the z-cut LN substrate 1 (or the package case side faces 11*a* and 11*b*).

As is well known, a coupling efficiency η when a Gaussian beam whose wavelength is λ and spot size is w is coupled to an angular declination at an angle of Δθ is given by the following formula (refer to "Basis and Application of Optical Coupling System for Optical Devices" by Kenji Kohno, Second Edition, Gendai Kougakusha, June 1998, p 45, p. 168.).

$$\eta = \exp(-(\pi \cdot w \cdot \Delta\theta/\lambda)^2) \quad (1)$$

Namely, when the signal light monomode optical fiber 7 is installed so as to be parallel to the side faces 1*c* and 1*d* of the z-cut LN substrate 1 (or the package case side faces 11*a* and 11*b*), a slant declination at Δθ is brought about between the light refracted at the substrate end face 1*b* and the optical axis of the signal light monomode optical fiber. As a result, a coupling loss expressed by formula (1) is generated when the refracted light is coupled to the signal light monomode optical fiber 7.

Accordingly, in order to suppress an increase in loss of the light due to the angular declination, as shown in FIG. 9, it is necessary to fix the signal light monomode optical fiber 7 at a slant to the package case side faces 11*a* and 11*b*.

FIG. 11 shows a top view of a state in which the signal light monomode optical fiber 7 and the glass capillary 6 in FIG. 7 are mounted in the package case 11.

In FIG. 11, reference numeral 11 is a package case, 12 is a fiber covering material, 13 is a solder material for airtight sealing, 14 is a tube portion of the package case 11, and 15 is an adhesive fixing the fiber covering material 12 of the signal light monomode optical fiber 7 to the tube portion 14 of the package case 11.

As described above, the signal light monomode optical fiber 7 is fixed to the end face 1*b* of the z-cut LN substrate 1 at a slant of large angle. Therefore, the signal light monomode optical fiber 7 and the fiber covering material 12 are inclined at a large angle in the tube portion 14 of the package case 11.

By the way, when the signal light monomode optical fiber 7 and the glass capillary 6 are fixed to the end face 1*b* of the z-cut LN substrate 1, it is necessary to adjust the position of the signal light monomode optical fiber 7 in a direction perpendicular to the optical axis and in the optical axis direction in order to bring the output optical waveguide 2*e* and the optical axis of the signal light monomode optical fiber 7 in line.

However, as described above, in the prior art shown in FIG. 11, the signal light monomode optical fiber 7 and the fiber covering material 12 are inclined in the tube portion 14 of the package case 11 as well.

Then, the side faces 1*c* and 1*d* of the z-cut LN substrate 1 or the package case side faces 11*a* and 11*b* are made to be reference lines for mounting when the signal light monomode optical fiber 7 is mounted. For this reason, in the first place, it is technically difficult to adjust and mount the signal light monomode optical fiber 7 so as to be positioned at a slant of a large angle to those reference lines.

Further, the inclination of the signal light monomode optical fiber 7 is large. Thus, in order to ensure a sufficient margin for positioning, a diameter $D_1$ of the hole through which the signal light monomode optical fiber 7 passes is made large to be about 2 mm, and the inside diameter $D_2$ of the tube portion 14 is made large to be about 5 mm.

Accordingly, it is necessary to use the solder material 13 for airtight sealing in large quantity. Because the tube portion 14 is kept at a high temperature of 200° C. or more for several tens of seconds in order to melt the solder material 13, there is a problem that the fiber covering material which is weak to high heat changes in quality.

As described above, in the prior art, a light output from the LN substrate end face is output at a slant to the direction of the side faces of the LN substrate (or the side faces of the package case), and therefore, the signal light monomode optical fiber as well is fixed at a slant of a large angle to the package case.

As a result, in the prior art as described above, it is difficult to position the signal light monomode optical fiber, or it is impossible to sufficiently carry out positioning. Moreover, when an attempt is made to carry out positioning sufficiently, the inside diameter of the tube portion of the package case is made large, which brings about the problem that it is difficult to airtight-seal without the fiber covering material being damaged.

Therefore, the development of a waveguide type optical device having a structure in which it is possible to easily carry out mounting including positioning work and fixing work of the signal light monomode optical fiber so as to include making an inclined angle of the monomode optical fiber small has been desired.

DISCLOSURE OF INVENTION

Then, an object of the invention is to solve the problems in accordance with the prior art as described above, and to provide a compact and low-loss waveguide type optical device by having a structure in which it is possible to easily carry out mounting including positioning work and fixing work of the signal light monomode optical fiber so as to include making an inclined angle of the monomode optical fiber small.

In order to achieve the object, according to a first embodiment of the invention, there is provided a waveguide type optical device comprising:

a substrate (1);

an optical waveguide (2) formed upper the substrate (1);

functional optical waveguides (2*c*-1, 2*c*-2) provided to the optical waveguide (2);

at least one of an optical input end face (2*f*) and an optical output end face (2*g*) for the optical waveguide (2) which are provided to substrate end faces (1*a*, 1*b*) which are ends at longitudinal direction sides of the substrate (1); and at least one of an input optical waveguide (2*a*) connecting the optical input end face (2*f*) and the functional optical waveguides (2*c*-1, 2*c*-2), and an output optical waveguide (2e) connecting the optical output end face (2g) and the functional optical waveguides (2c-1, 2c-2), wherein the at least one of the input optical waveguide (2a) and the output optical waveguide (2e) is formed so as to form angles other than 0 with the functional optical waveguides (2c-1, 2c-2) at the at least one of the optical input end face (2f) and the optical output end face (2g), and so as to make angles formed to the substrate end faces (1a, 1b) at the respective sides different from 90°.

In order to achieve the object, according to a second embodiment of the invention, there is provided the waveguide type optical device according to the first embodiment, further comprising:

a package case (11) into which the substrate (1) is to be housed, wherein, in order for angles formed by at least one of a light input to the optical input end face (2f) and a light output from the optical output end face (2g), and substrate end faces (1a, 1b) which are ends at short-side direction sides of the substrate (1) or package case side faces (11a, 11b) at short-side direction sides of the package case (11) to be desired angles, angles formed by at least one of the input optical waveguide (2a) structuring the optical input end face (2f) and the output optical waveguide (2e) structuring the optical output end face (2g), and the functional optical waveguides (2c-1, 2c-2) are made different from 0, and angles formed to the substrate end faces (1a, 1b) at the respective sides are made different from 90°.

In order to achieve the object, according to a third embodiment of the invention, there is provided the waveguide type optical device according to the first embodiment, further comprising:

a package case (11) into which the substrate (1) is to be housed, wherein, in order for an absolute value of angles formed by at least one of a light input to the optical input end face (2f) and a light output from the optical output end face (2g), and the substrate end faces (1c, 1d) which are the ends at the short-side direction sides of the substrate (1) or the package case side faces (11a, 11b) at the short-side direction sides of the package case (11) to be made smaller than an absolute value of angles formed by a light input to the optical input end face (2f) or a light output from the optical output end face (2g), and the substrate end faces (1c, 1d) which are the ends at the short-side direction sides of the substrate or the package case side faces (11a, 11b) at the short-side direction sides of the package case (11) when it is assumed that at least one of the input optical waveguide (2a) and the output optical waveguide (2e) is parallel to the functional optical waveguides (2c-1, 2c-2), angles formed by at least one of the input optical waveguide (2a) and the output optical waveguide (2e) with the functional optical waveguides (2c-1, 2c-2) are made different from 0, and angles formed to the substrate end faces (1a, 1b) at the respective sides are made different from 90°.

In order to achieve the object, according to a fourth embodiment of the invention, there is provided the waveguide type optical device according to the first embodiment, further comprising:

a package case (11) into which the substrate (1) is to be housed, wherein, in order for a light input to the optical input end face (2f) or a light output from the optical output end face (2g) to be input or output in a direction parallel to the substrate end faces (1c, 1d) which are the ends at the short-side direction sides of the substrate (1) or the package case side faces (11a, 11b) at the short-side direction sides of the package case (11), angles formed by at least one of the input optical waveguide (2a) and the output optical waveguide (2e) with the functional optical waveguides (2c-1, 2c-2) are made different from 0, and angles formed to the substrate end faces (1a, 1b) at the respective sides are made different from 90°.

In order to achieve the object, according to a fifth embodiment of the invention, there is provided the waveguide type optical device according to the first embodiment, wherein a monomode optical fiber (7) is provided in the vicinity of the optical input end face (2f) or in the vicinity of the optical output end face (2e).

In order to achieve the object, according to a sixth embodiment of the invention, there is provided the waveguide type optical device according to the second embodiment, wherein, given that an equivalent refractive index of the input optical waveguide (2a) or the output optical waveguide (2e), or a refractive index of the substrate (1) is $n_1$, a refractive index or an equivalent refractive index of a medium which the input optical waveguide (2a) or the output optical waveguide (2e) contacts is $n_2$, an angle formed by the optical input end face (2f) or the optical output end face (2g) to the perpendicular line with respect to the substrate side faces (1c, 1d) is $\theta_{OA}$, angles formed by the input optical waveguide (2a) or the output optical waveguide (2e) to the substrate side faces (1c, 1d) are $\theta_{LA}$, and angles formed by a light incident into the input optical waveguide (2a) or a light emitted from the output optical waveguide (2e) to the functional optical waveguides (2c-1, 2c-2) are $\Delta\theta$, and when the $\Delta\theta$ is given by $\Delta\theta = (\theta_{OA} - \theta_{LA})n_1/n_2 - \theta_{OA}$, in order for angles formed by a light incident into the input optical waveguide (2a) and the package case side faces (11a, 11b), or angles formed by a light output from the output optical waveguide (2e) and the package case side faces (11a, 11b) at the short-side direction sides to be desired angles, the $\theta_{LA}$ and the $(\theta_{OA} - \theta_{LA})$ are made different from 0.

In order to achieve the object, according to a seventh embodiment of the invention, there is provided the waveguide type optical device according to the third embodiment, wherein, given that an equivalent refractive index of the input optical waveguide (2a) or the output optical waveguide (2e), or a refractive index of the substrate (1) is $n_1$, a refractive index or an equivalent refractive index of a medium which the input optical waveguide (2a) or the output optical waveguide (2e) contacts is $n_2$, an angle formed by the optical input end face (2f) or the optical output end face (2g) to the perpendicular line with respect to the substrate side faces (1c, 1d) is $\theta_{OA}$, angles formed by the input optical waveguide (2a) or the output optical waveguide (2e) to the substrate side faces (1c, 1d) are $\theta_{LA}$, and angles formed by a light incident into the input optical waveguide (2a) or a light emitted from the output optical waveguide (2e) to the functional optical waveguides (2c-1, 2c-2) are $\Delta\theta$, and when the $\Delta\theta$ is given by $\Delta\theta = (\theta_{OA} - \theta_{LA})n_1/n_2 - \theta_{OA}$, in order for an absolute value of the $\Delta\theta$ to be smaller than an absolute value of the $\Delta\theta$ in a case where a value of the $\theta_{LA}$ is made to be 0, the $\theta_{LA}$ is made different from 0.

In order to achieve the object, according to an eighth embodiment of the invention, there is provided the waveguide type optical device according to the fourth embodiment, wherein, given that an equivalent refractive index of the input optical waveguide (2a) or the output optical waveguide (2e), or a refractive index of the substrate (1) is $n_1$, a refractive index or an equivalent refractive index of a medium which the input optical waveguide (2a) or the output optical waveguide (2e) contacts is $n_2$, an angle formed by the optical input end face (2f) or the optical output end face (2g) to the perpendicular line with respect to the substrate side faces (1c, 1d) is $\theta_{OA}$, an angle formed by the optical input end face (2f) or the optical output end face (2g) to the perpendicular line with respect to the package case side faces (11a, 11b) is $\theta_{OB}$, angles formed by the input optical waveguide (2a) or the output optical waveguide (2e) to the substrate side faces (1c, 1d) are $\theta_{1A}$, and angles formed by the input optical waveguide (2a) or the output optical waveguide (2e) to the package case side faces (11a, 11b) are $\theta_{1B}$, the $n_1$, the $n_2$, the $\theta_{OA}$, and the $\theta_{1A}$ satisfy a relationship of $\theta_{OA} = n_1 \theta_{1A}/(n_1 - n_2)$, or the $n_1$, the $n_2$, the $\theta_{OB}$, and the $\theta_{1B}$ satisfy a relationship of $\theta_{OB} = n_1 \theta_{1B}/(n_1 - n_2)$.

In order to achieve the object, according to a ninth embodiment of the invention, there is provided the waveguide type optical device according to the second embodiment, wherein, in order for an absolute value of angles formed by at least one of a light input to the optical input end face (2f) and a light output from the optical output end face (2g), and the substrate end faces (1c, 1d) which are the ends at the short-side direction sides of the substrate (1) or the package case side faces (11a, 11b) at the short-side direction sides of the package case (11) to be made smaller than an absolute value of angles formed by a light input to the optical input end face (2f) or a light output from the optical output end face (2g), and the substrate end faces (1c, 1d) which are the ends at the short-side direction sides of the substrate or the package case side faces (11a, 11b) at the short-side direction sides of the package case (11) when it is assumed that at least one of the input optical waveguide (2a) and the output optical waveguide (2e) is parallel to the functional optical waveguides (2c-1, 2c-2), angles formed by at least one of the input optical waveguide (2a) and the output optical waveguide (2e) with the functional optical waveguides (2c-1, 2c-2) are made different from 0, and angles formed to the substrate end faces (1a, 1b) at the respective sides are made different from 90°.

In order to achieve the object, according to a tenth embodiment of the invention, there is provided the waveguide type optical device according to the second, wherein, in order for a light input to the optical input end face (2f) or a light output from the optical output end face (2e) to be input or output in a direction parallel to the substrate end faces (1c, 1d) which are the ends at the short-side direction sides of the substrate (1) or the package case side faces (11a, 11b) at the short-side direction sides of the package case (11), angles formed by at least one of the input optical waveguide (2a) and the output optical waveguide (2e) with the functional optical waveguides (2c-1, 2c-2) are made different from 0, and angles formed to the substrate end faces (1a, 1b) at the respective sides are made different from 90°.

In order to achieve the object, according to an eleventh embodiment of the invention, there is provided the waveguide type optical device according to the third embodiment, wherein, in order for a light input to the optical input end face (2f) or a light output from the optical output end face (2g) to be input or output in a direction parallel to the substrate end faces (1c, 1d) which are the ends at the short-side direction sides of the substrate (1) or the package case side faces (11a, 11b) at the short-side direction sides of the package case (11), angles formed by at least one of the input optical waveguide (2a) and the output optical waveguide (2e) with the functional optical waveguides (2c-1, 2c-2) are made different from 0, and angles formed to the substrate end faces (1a, 1b) at the respective sides are made different from 90°.

In order to achieve the object, according to a twelfth embodiment of the invention, there is provided the waveguide type optical device according to the second embodiment, wherein a monomode optical fiber (7) is provided in the vicinity of the optical input end face (2f) or in the vicinity of the optical output end face (2e).

In order to achieve the object, according to a thirteenth embodiment of the invention, there is provided the waveguide type optical device according to the third embodiment, wherein a monomode optical fiber (7) is provided in the vicinity of the optical input end face (2f) or in the vicinity of the optical output end face (2e).

In order to achieve the object, according to a fourteenth embodiment of the invention, there is provided the waveguide type optical device according to the fourth embodiment, wherein a monomode optical fiber (7) is provided in the vicinity of the optical input end face (2f) or in the vicinity of the optical output end face (2e).

In accordance with a representative aspect of the waveguide type optical device according to the invention, the light is output or input in a direction parallel to the side faces of the substrate (or the side faces of the package case) from the end face of the substrate of the waveguide type optical device. Consequently, a loss in coupling with the monomode optical fiber for optical output or optical input can be made small.

Further, in accordance with the representative aspect of the waveguide type optical device according to the invention, the monomode optical fiber for outputting or inputting light can be attached so as to be parallel to the side faces of the substrate (or the side faces of the package case) of the waveguide type optical device, and moreover, a light parallel to the side faces of the package case can be output or input to the end face of the substrate. Accordingly, there are excellent advantages that it is possible to easily carry out mounting of the optical fiber without an increase in insertion loss of the light, and the package case can be made compact.

Further, in accordance with other aspects of the invention, a light is output or input at a desired angle or a relatively shallow angle from the end face of the substrate of the waveguide type optical device. Therefore, it is possible to make a loss in coupling with the monomode optical fiber for optical output or for optical input small.

Further, in accordance with the other aspects of the invention, the monomode optical fiber for outputting or inputting light can be attached at a desired angle or a relatively shallow angle to the side faces of the substrate (or the side faces of the package case) of the waveguide type optical device. As a consequence, there are excellent advantages that it is possible to easily carry out mounting of the optical fiber without an increase in insertion loss of the light, and the package case can be made compact.

BRIEF DESCRIPTION OF DRAWINGS

FIG. 6 is a top view for explanation of a state in which the signal light monomode optical fiber 7 is mounted in a third embodiment of the invention.

BEST MODE FOR CARRYING OUT THE INVENTION

Hereinafter, embodiments of a waveguide type optical device according to the invention will be described with reference to FIGS. 1 to 6.

In FIGS. 1 to 6, because numbers which are the same as those in the prior art shown in FIGS. 7 to 11 correspond to the same portions, here, detailed descriptions of the portions having the same numbers as those in the prior art shown in FIGS. 7 to 11 will not be repeated.

First Embodiment

Figure 1:
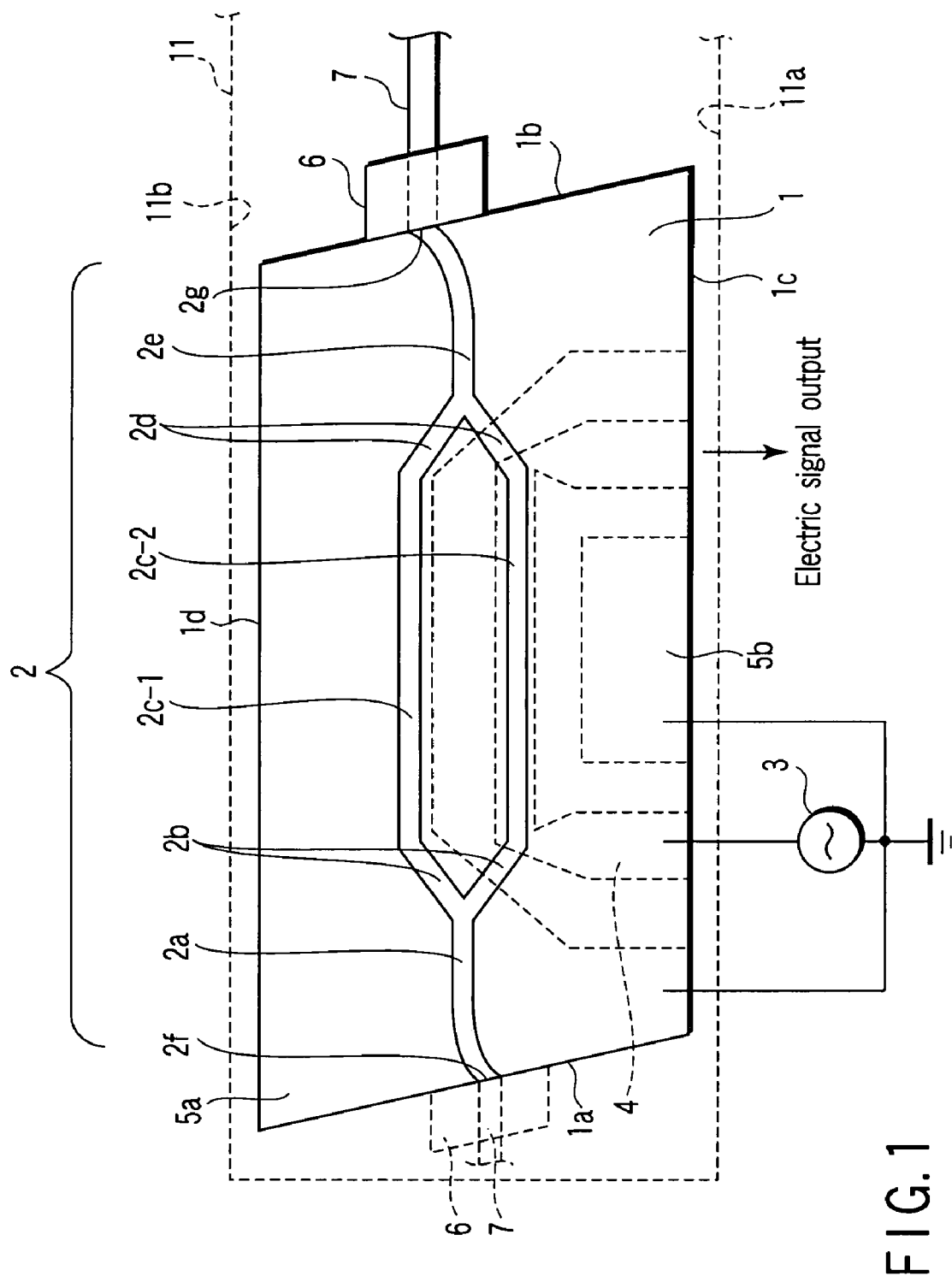
FIG. 1 is a top view for explanation of a structure of a first embodiment of a waveguide type optical device according to the invention.
Figure 2:
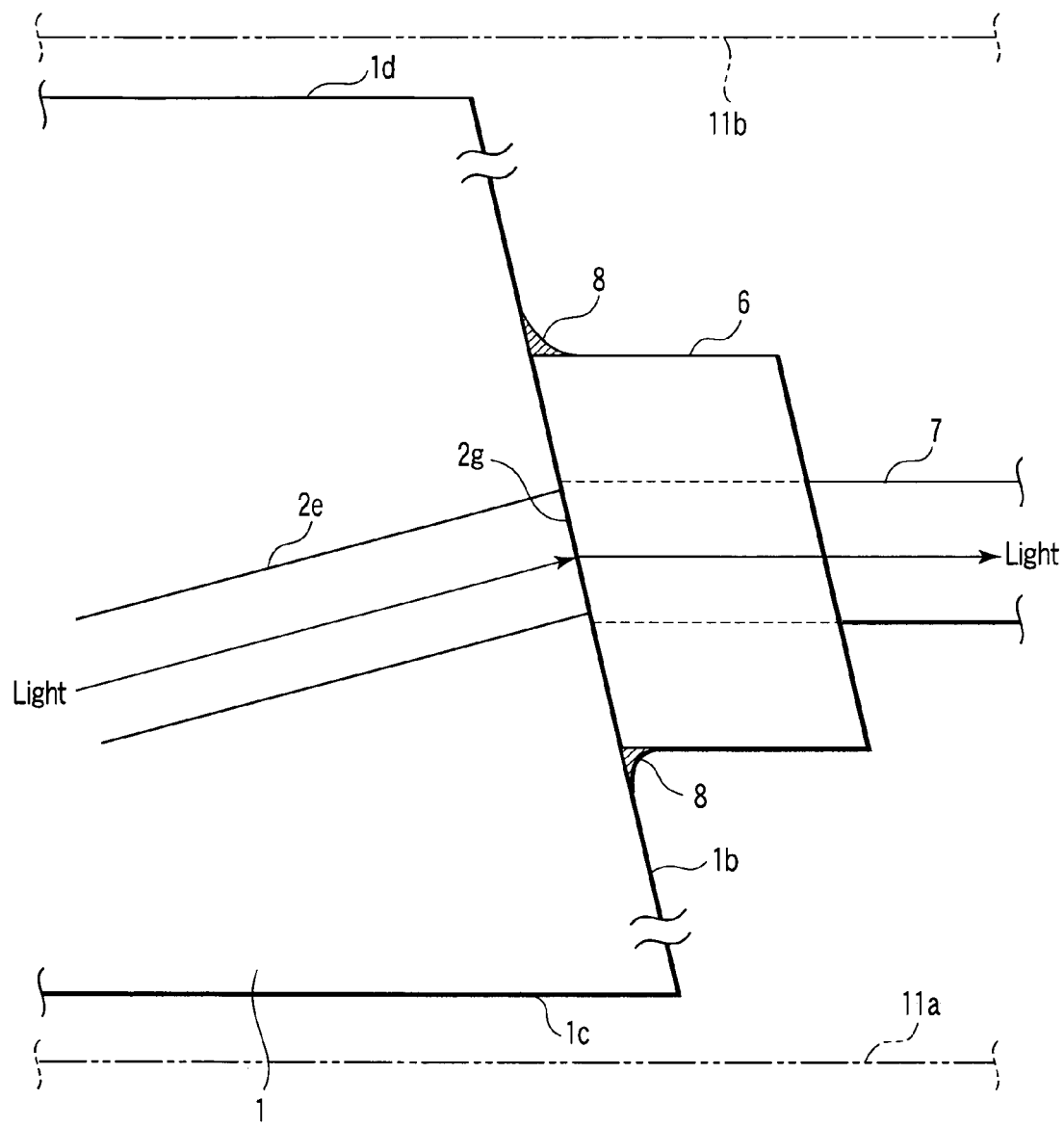
FIG. 2 is a top view showing a structure of a main part of FIG. 1.
Figure 3:
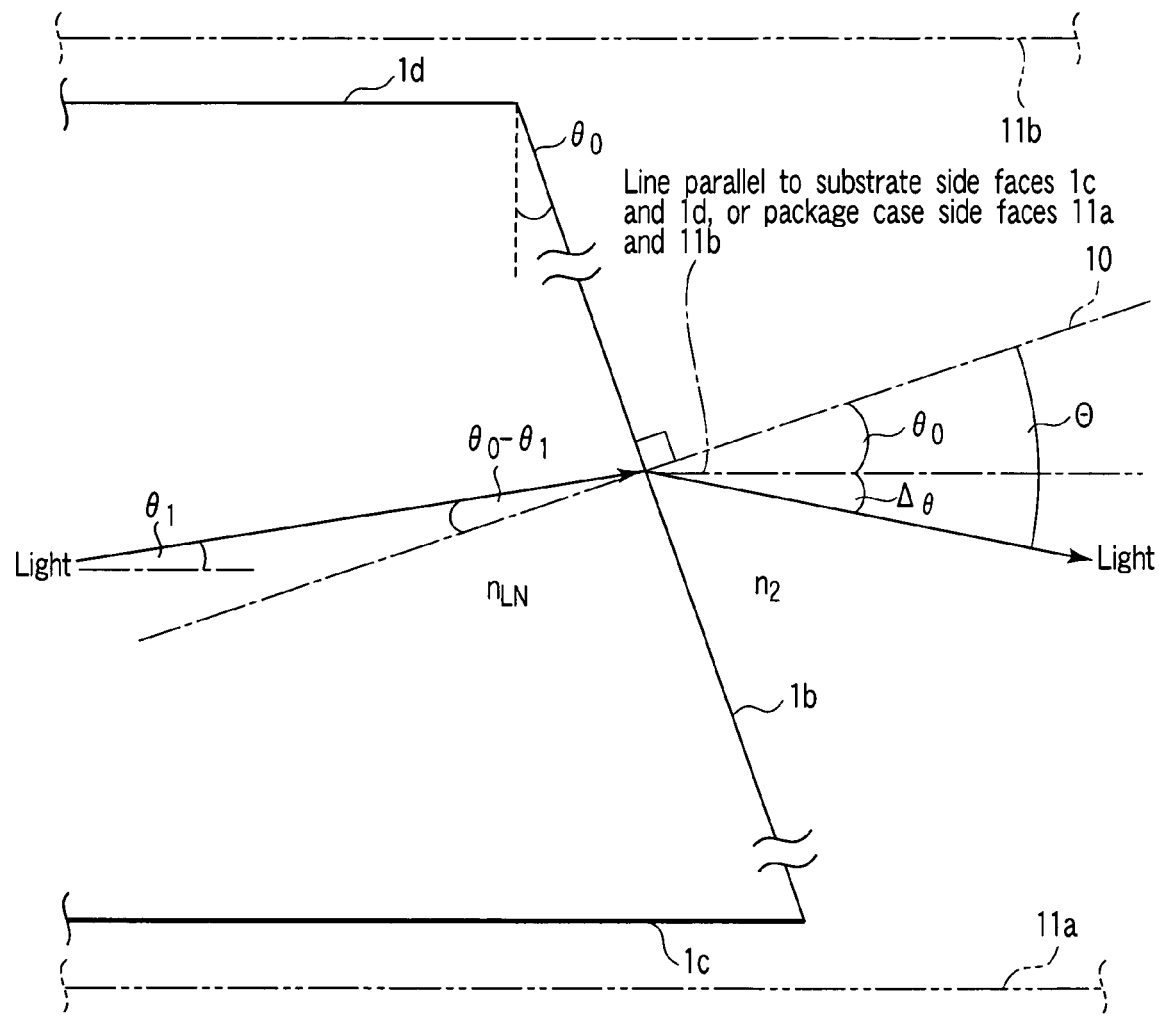
FIG. 3 is a view shown for explanation of the principle of the waveguide type optical device of FIG. 1.

FIG. 1 is a top view showing a structure of a first embodiment of a waveguide type optical device according to the invention. FIG. 2 is a top view showing a structure of a case where, as will be described later, a light is output from an output optical waveguide 2e as a structure of a main part of FIG. 1. FIG. 3 shows a view of the principle of the waveguide type optical device of FIG. 1.

FIG. 2 shows, as the structure in which a light is output from the output optical waveguide 2e, a mounting state in which a glass capillary 6 to which a signal light monomode optical fiber 7 has been fixed is fixed to an end face 1b of a z-cut LN substrate 1.

In FIG. 2, reference numeral 8 is an UV cure adhesive which becomes hardened by irradiating ultraviolet radiation thereto, and has seeped into the end face 1b of the z-cut LN substrate 1, the glass capillary 6, and the end faces of the signal light monomode optical fiber 7 as well.

Note that, as shown by a dashed line in FIG. 1, a structure when a light is input to an input optical waveguide 2a as well is the same as the structure when a light is output from the output optical waveguide 2e, and thus, descriptions thereof will not be repeated. Hereinafter, the case where a light is output from the output optical waveguide 2e will be described.

Then, in the waveguide type optical device according to the invention, the following mode is included as a basic structure (1).

Namely, the waveguide type optical device according to the basic structure (1) has, as shown in FIGS. 1 to 3, the substrate 1, an optical waveguide 2 formed on the substrate 1, functional optical waveguides 2c-1 and 2c-2 which are provided to the optical waveguide 2, at least one of an optical input end face 2f and an optical output end face 2g for the optical waveguide 2 which are provided to the substrate end faces 1a and 1b which are the ends in a longitudinal direction of the substrate 1, and at least one of the input optical waveguide 2a connecting the optical input end face 2f and the functional optical waveguides 2c-1 and 2c-2, and the output optical waveguide 2e connecting the optical output end face 2g and the functional optical waveguides 2c-1 and 2c-2. At least one of the input optical waveguide 2a and the output optical waveguide 2e is formed so as to form angles other than 0 with the functional optical waveguides 2c-1 and 2c-2, and so as to make angles formed with the substrate end faces 1a and 1b at the respective sides differ from 90°.

As shown in FIGS. 2 and 3, the light propagating through the output optical waveguide 2e is refracted by Snell's law at the end face 1b of the z-cut LN substrate 1.

In the first embodiment of the invention, as shown in FIG. 3, the optical axis of the output optical waveguide 2e is inclined at $\theta_1$ to the side faces 1c and 1d of the z-cut LN substrate 1 (or the package case side faces 11a and 11b). As a result, the optical axis of the light propagating through the output optical waveguide 2e is also inclined at $\theta_1$.

The end face 1b of the z-cut LN substrate 1 is inclined at $\theta_0$ to the perpendicular line with respect to the side faces of the z-cut LN substrate 1 (or the perpendicular line with respect to the package case side faces 11a and 11b).

As will be described hereinafter, in the respective embodiments of the invention, an inclination $\theta_1$ of the optical axis of the output optical waveguide 2e and an inclination $\theta_0$ of the substrate end face 1b perform a significant function.

Here, $n_{LN}$ is an equivalent refractive index of the output optical waveguide 2e. It is assumed that the UV cure adhesive 8 has seeped into the junction between the output optical waveguide 2e and the signal light monomode optical fiber 7. Accordingly, a refractive index of the UV cure adhesive 8 and an equivalent refractive index of the signal light monomode light fiber 7 are expressed as n on the assumption that those are equivalent to one another.

Figure 10:
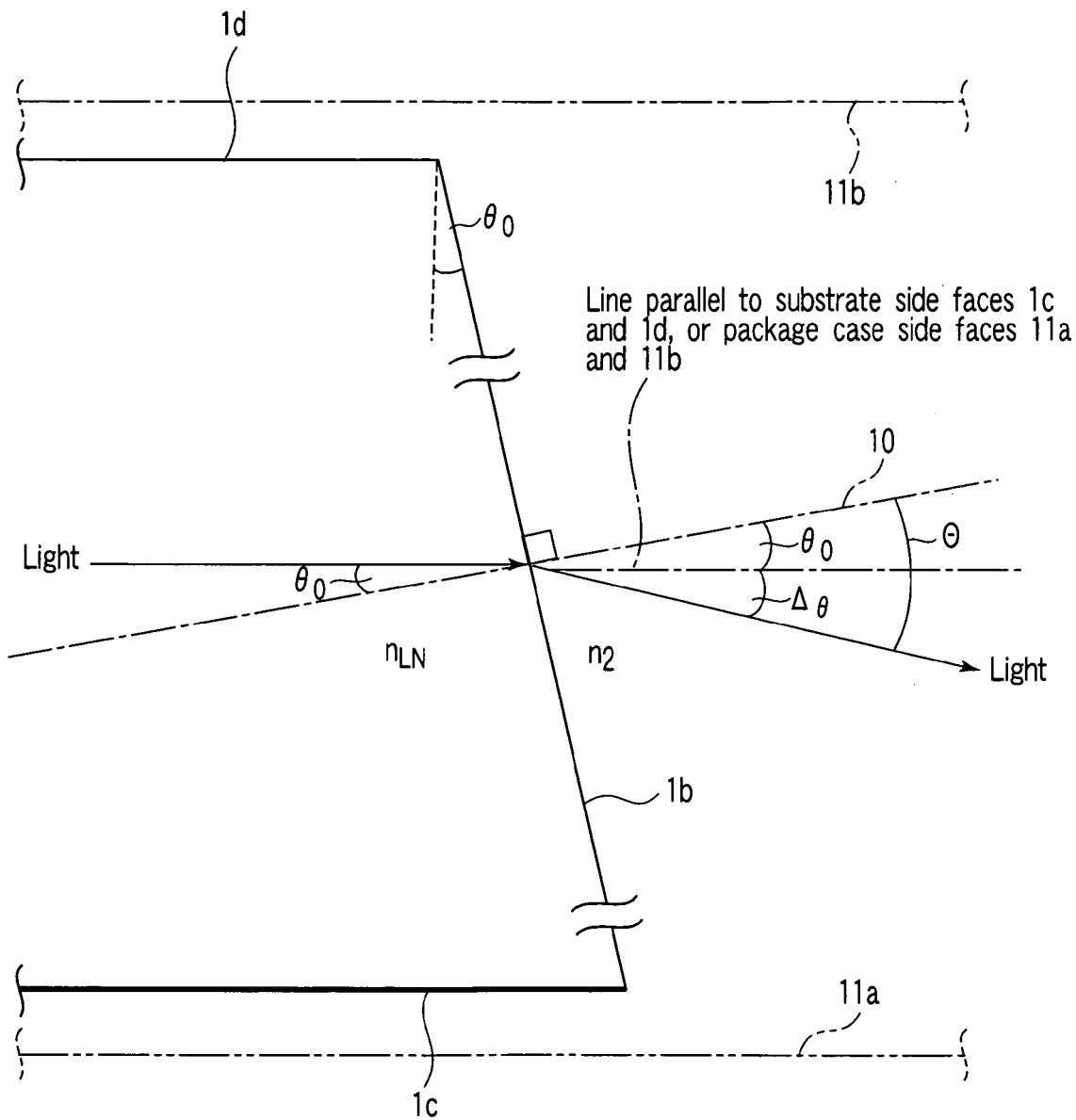
FIG. 10 is a view showing a situation in which a light is refracted at the end face 1b of the z-cut LN substrate 1 of FIG. 7.

In the same way as in the prior art shown in FIG. 10, in FIG. 3 as well, suppose that an angle formed by the light propagating while being refracted at the end face 1b of the z-cut LN substrate 1 with a perpendicular line 10 with respect to the end face 1b of the z-cut LN substrate 1 is $\Theta$.

In FIG. 3, $\Delta\theta(=\Theta-\theta_0)$ is an angle formed by the light refracted at the substrate end face 1b and the line parallel to the side faces $1c$ and $1d$ of the z-cut LN substrate 1 (or the package case side faces $11a$ and $11b$).

The following formula is formulated from Snell's law in FIG. 3.

$$n_{LN}(\theta_0-\theta_1)=n_2\Theta \quad (2)$$

Here, given that $\Theta=\theta_0+\Delta\theta$, $$n_{LN}(\theta_0-\theta_1)=n_2(\theta_0+\Delta\theta) \quad (3)$$

is formulated. Therefore, between $\theta_0$ and $\Delta\theta$, the relational expression $$\theta_0=(n_{LN}\theta_1+n_2\Delta\theta)/(n_{LN}-n_2) \quad (4)$$

or, the following relational expression $$\Delta\theta=(\theta_0-\theta_1)n_{LN}/n_2-\theta_0 \quad (4\text{-}1)$$

is formulated.

Moreover, given that $\Delta\theta=0$, $$\theta_0=(n_{LN}\theta_1)/(n_{LN}-n_2) \quad (5)$$

is formulated.

For example, given that an equivalent refractive index $n_{LN}$ of the output optical waveguide $2e$ formed on the z-cut LN substrate 1 and refractive indexes $n_2$ of the signal light monomode optical fiber 7 and the UV cure adhesive 8 for fixing it are respectively set as $n_{LN}=2.14$ and $n_2=1.45$, the following formula is obtained.

$$\begin{aligned}\theta_0 &= (2.14\theta_1 + 1.45\Delta\theta)/(2.14 - 1.45) \quad (6)\\ &= 3.10\theta_1 + 2.10\Delta\theta\end{aligned}$$

Given that $\Delta\theta=0$, $$\theta_0=3.10\theta_1+2.10\Delta\theta \quad (7)$$

is formulated.

As an example, a case where an inclination $\theta_1$ of the output optical waveguide $2e$ to the side faces $1c$ and $1d$ of the z-cut LN substrate 1 (or the package case side faces $11a$ and $11b$) is 3° will be considered.

In this case, in order for the light output from the substrate end face $1b$ to be parallel to the side faces $1c$ and $1d$ of the z-cut LN substrate 1 (or the package case side faces $11a$ and $11b$), i.e., to be $\Delta\theta=0$ from formula (7), an angle $\theta_0$ of the substrate end face $1b$ to the perpendicular line with respect to the side faces $1c$ and $1d$ of the z-cut LN substrate 1 (or the perpendicular line with respect to the package case side faces $11a$ and $11b$) may be set to 9.3°.

Note that, when an equivalent refractive index $n_{LN}$ of the output optical waveguide $2e$ is substantially the same as an refractive index of the z-cut LN substrate 1, the equivalent refractive index $n_{LN}$ of the output optical waveguide $2e$ in formula (2) to formula (5) can be replaced with the refractive index of the z-cut LN substrate 1.

In the first embodiment, an inclination $\theta_1$ of the output optical waveguide $2e$ and an inclination $\theta_0$ of the substrate end face $1b$ are inclined at an optimum angle, it results in $\Delta\theta=0$ in formula (4), and formula (5) is formulated.

Namely, the optical axis of the signal light monomode optical fiber 7 can be made parallel to the side faces $1c$ and $1d$ of the z-cut LN substrate 1 (or the package case side faces $11a$ and $11b$).

Figure 4:
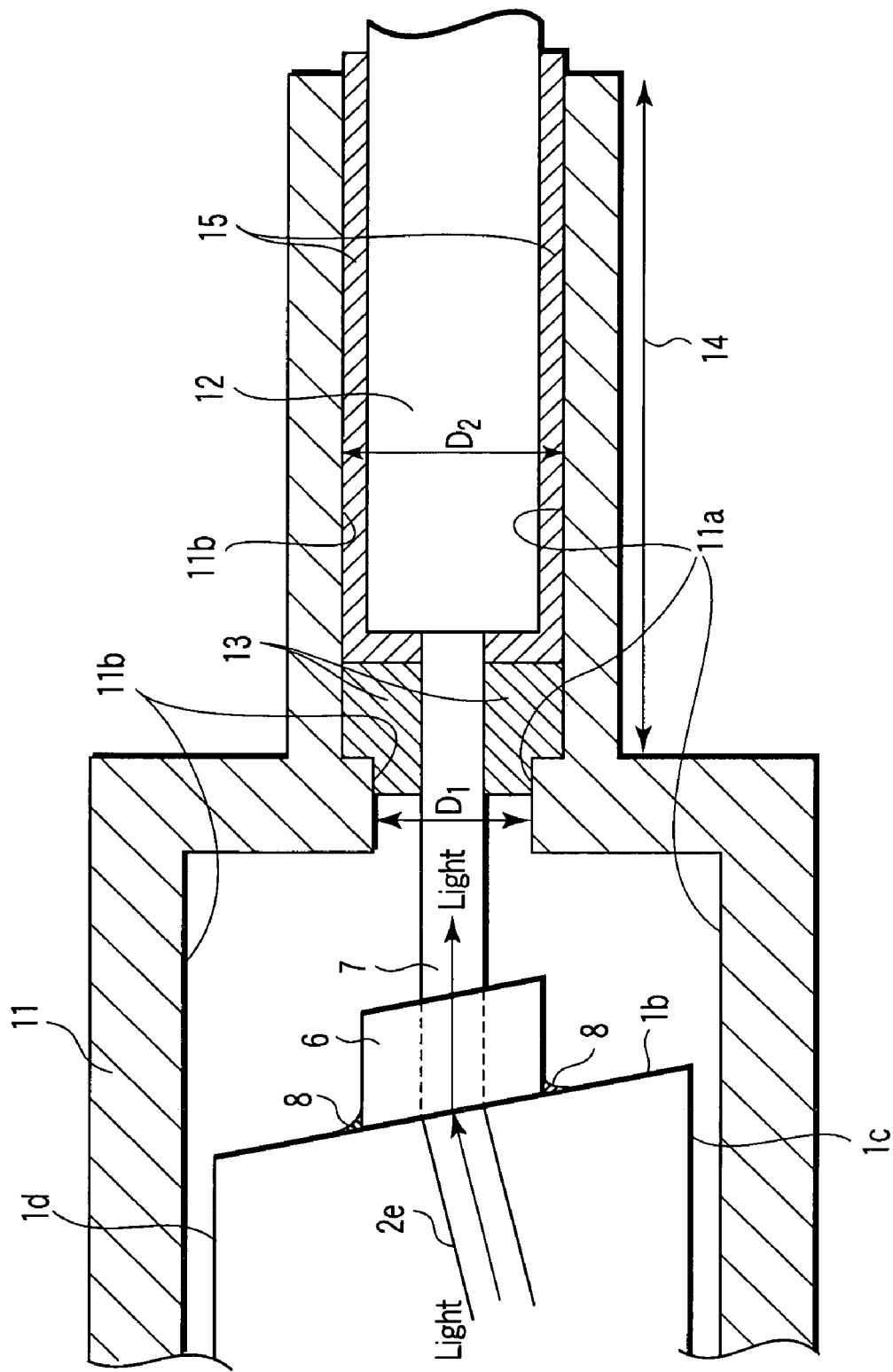
FIG. 4 is a top view showing a state in which a signal light monomode optical fiber 7 and a glass capillary 6 are practically mounted in the waveguide type optical device of FIG. 1.

FIG. 4 shows a top view of a state in which the signal light monomode optical fiber 7 and the glass capillary 6 are mounted in the waveguide type optical device of FIG. 1.

In FIG. 4, reference numeral 11 is a package case, 12 is a fiber covering material, and 13 is a solder material for airtight sealing, which maintains airtight by coupling the signal light monomode optical fiber 7 which has been partially metalized and the package case 11 together by the solder material 13.

Further, in FIG. 4, reference numeral 15 is an adhesive fixing the fiber covering material 12 of the signal light monomode optical fiber 7 to the tube portion 14 of the package case 11.

In the first embodiment of the invention, by appropriately setting an inclination $\theta_0$ of the substrate end face $1b$ in consideration of an equivalent refractive index $n_{LN}$ of the output optical waveguide $2e$ and a refractive index $n_2$ pf the UV cure adhesive 8 with respect to an inclination $\theta_1$ of the output optical waveguide $2e$, $\Delta\theta=0$, i.e., formula (5) is formulated. In addition, it is possible to fix the signal light monomode optical fiber 7 making it parallel to side faces $1c$ and $1d$ of the z-cut LN substrate 1 (or the package case side faces $11a$ and $11b$).

Note that, in FIG. 4, the package case side faces $11a$ and $11b$ denote the inner walls of the package case 11. However, it goes without saying that those may denote the outer walls when the inner walls and the outer walls are substantially parallel to one another.

Figure 11:
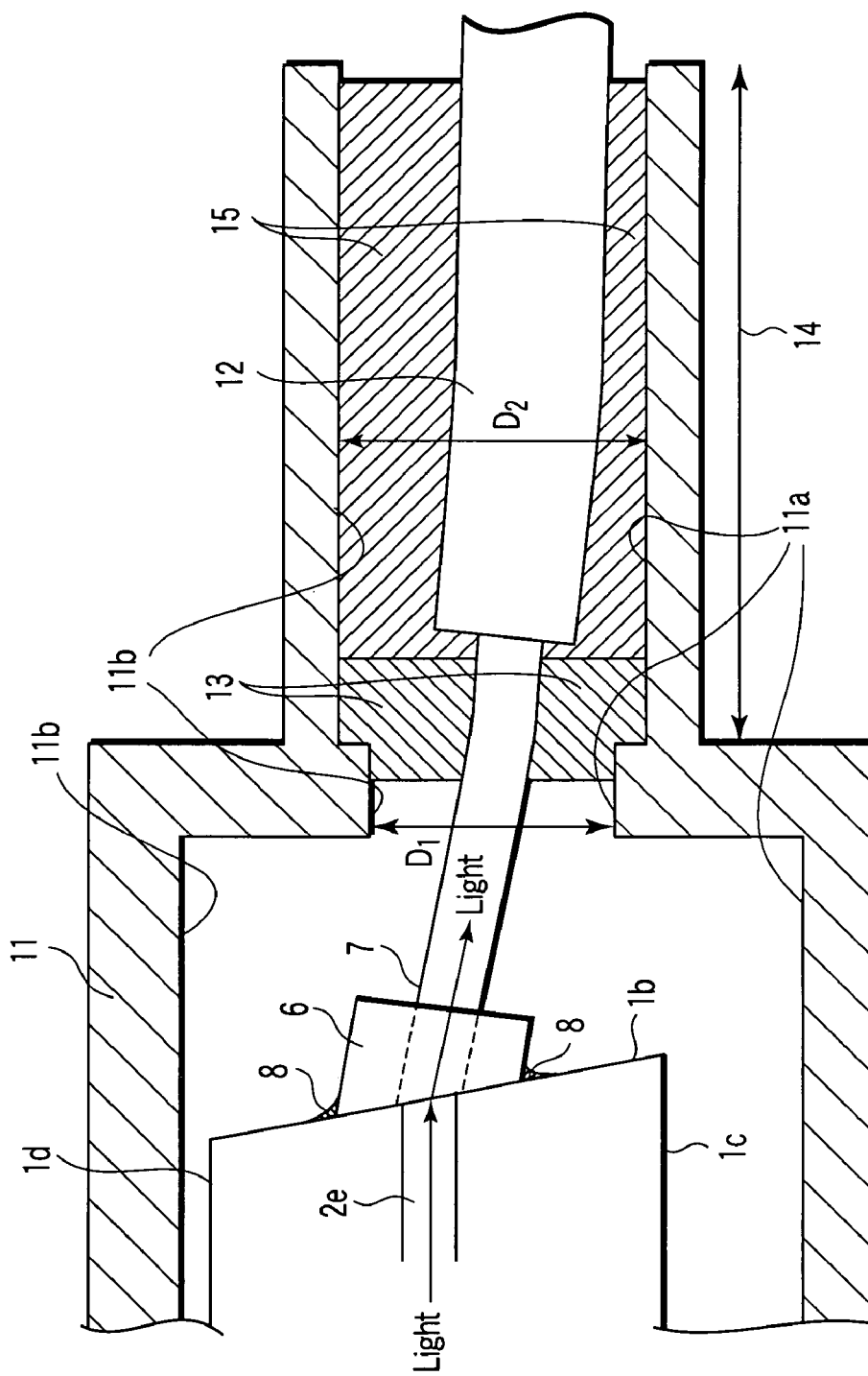
FIG. 11 is a top view showing a state in which the signal light monomode optical fiber 7 and the glass capillary 6 of FIG. 7 are mounted in a package case 11.

By the way, as described in the prior art shown in FIG. 11, when the signal light monomode optical fiber 7 and the glass capillary 6 are fixed to the end face $1b$ of the z-cut LN substrate 1, it is vital that the output optical waveguide $2e$ and the optical axes of the signal light monomode optical fiber 7 are brought in line to suppress an increase in coupling loss. Therefore, it is necessary to adjust the position of the signal light monomode optical fiber 7 so as to maintain a large angle in a direction perpendicular to the optical axis and in the optical axis direction.

On the other hand, as described above, in the first embodiment of the invention, it is possible to fix the signal light monomode optical fiber 7 so as to be parallel to the side faces $1c$ and $1d$ of the z-cut LN substrate 1 (or the package case side faces $11a$ and $11b$).

Therefore, in the first embodiment of the invention, when the signal light monomode optical fiber 7 is positioned/fixed, the side faces $1c$ and $1d$ of the z-cut LN substrate 1 (or the package case side faces $11a$ and $11b$) can be used as reference lines as described above, so that those work operations can be made easy.

Moreover, in the first embodiment of the invention, it is sufficient that a diameter $D_1$ of a hole through which the signal light monomode optical fiber 7 passes can be as small as about 1 mm, and a diameter $D_2$ of the tube portion 14 can be as small as about 2 mm. Accordingly, the solder material 13 for airtight sealing is used only in a small amount, and the tube portion 14 may be made to heat up to a high temperature only instantaneously in order to melt the solder material 13, which can solve the problem that the fiber covering material 12 which is weak to high heat changes in quality.

Second Embodiment

A second embodiment of the invention as well is structured such that, as shown in the first embodiment, the relation between $\theta_1$ and $\theta_0$ in which $\Delta\theta=0$, i.e., formula (5) is formulated is satisfied in formula (4).

In the second embodiment, the invention can be applied to, not only a technique that the signal light monomode optical fiber 7 is fixed to the end face 1b of the z-cut LN substrate 1 via the glass capillary 6 as in the first embodiment, but also a structure in which a light output from the substrate end face 1b propagates through space, i.e., an optical system using a lens.

Figure 5:
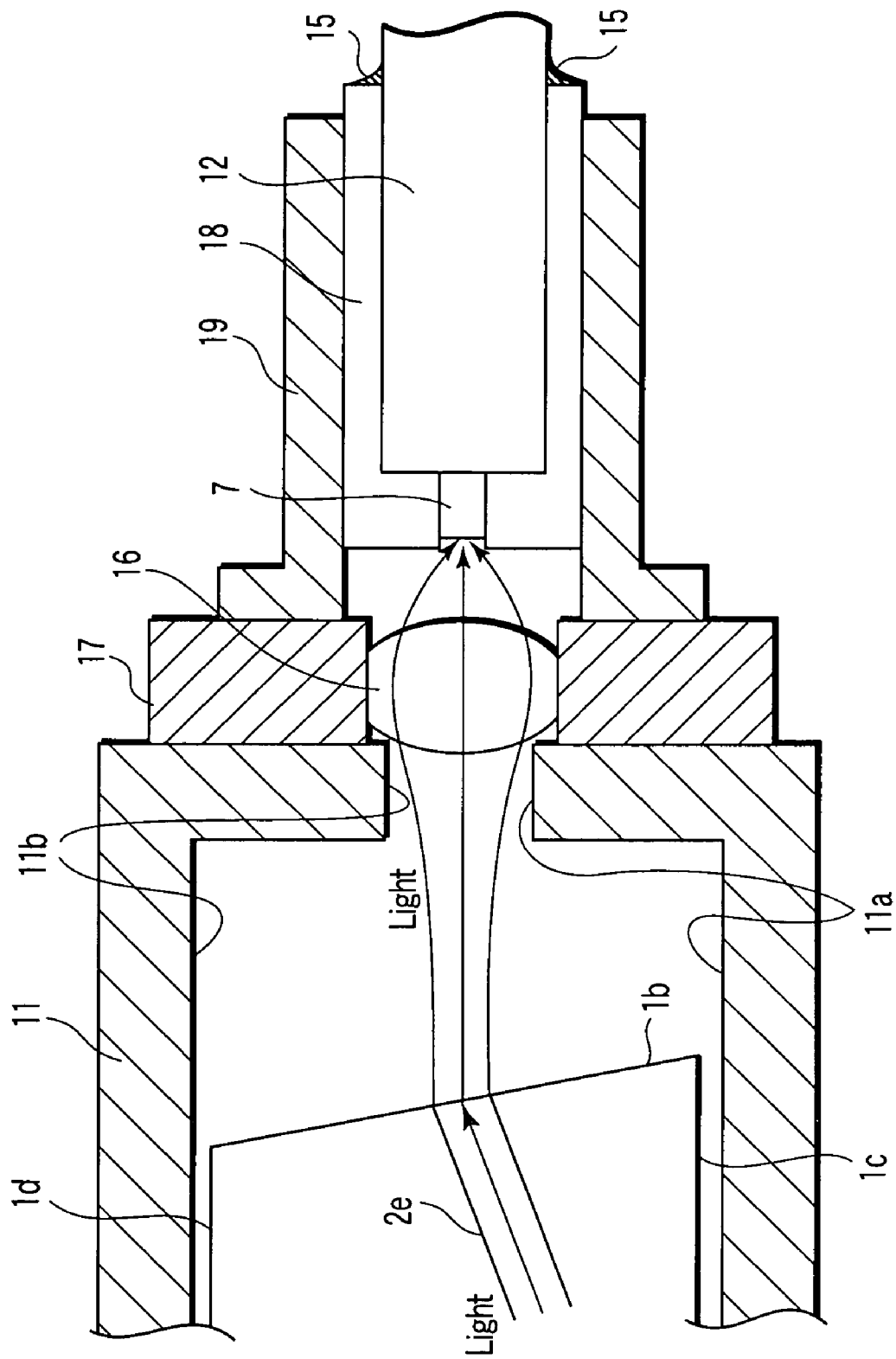
FIG. 5 is top view for explanation of a state in which the signal light monomode optical fiber 7 is mounted in a second embodiment of the invention.
Figure 7:
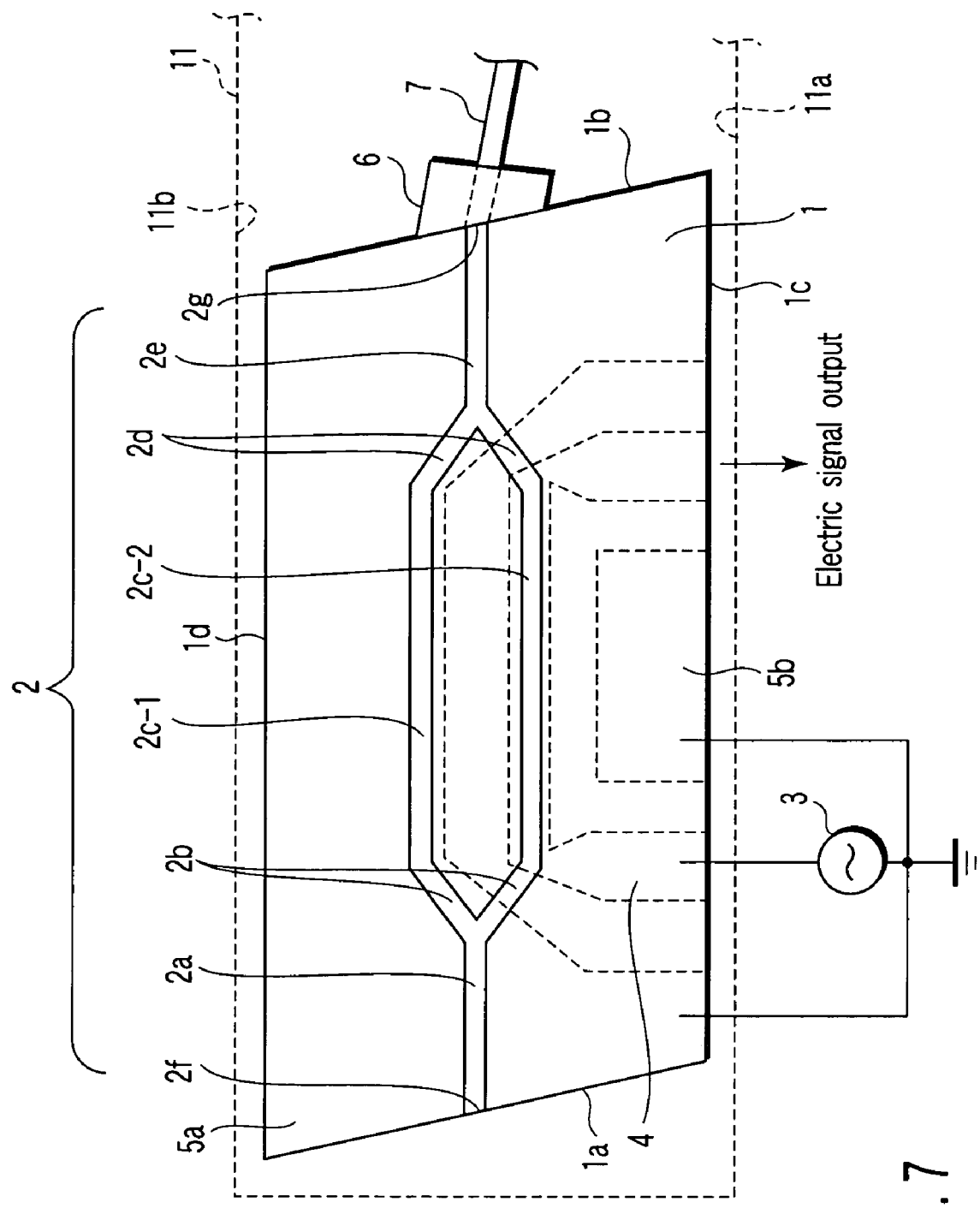
FIG. 7 is a top view showing a structure of an LN light modulator according to a prior art.
Figure 8A:
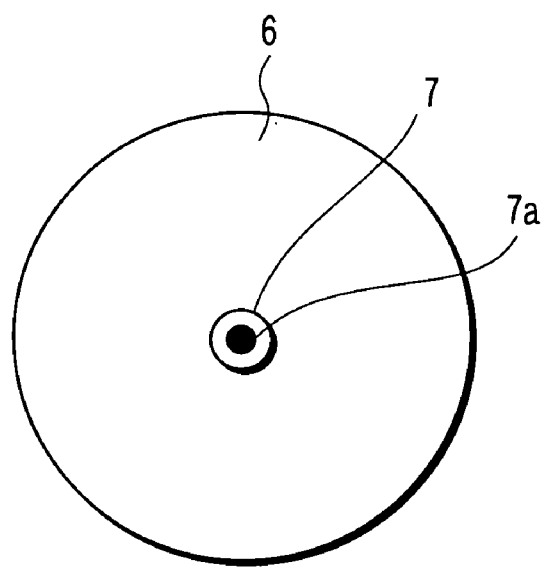
FIG. 8A is a front view showing a state in which the signal light monomode optical fiber 7 of FIG. 7 is fixed to the glass capillary 6.
Figure 8B:
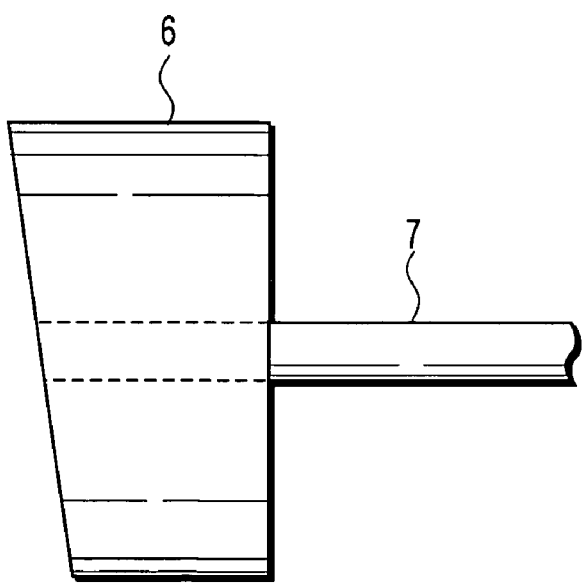
FIG. 8B is a side view showing a state in which the signal light monomode optical fiber 7 of FIG. 7 is fixed to the glass capillary 6.
Figure 9:
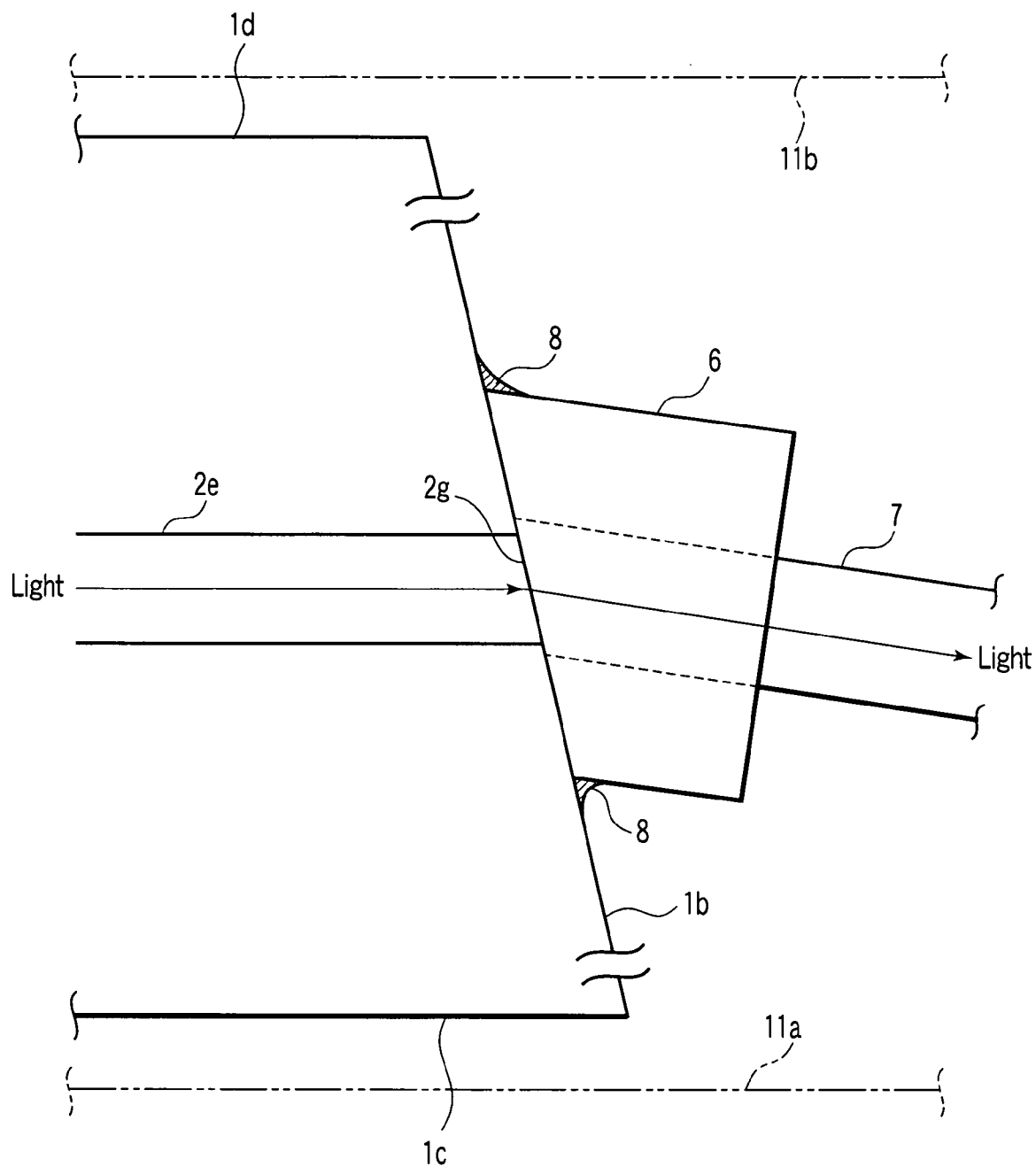
FIG. 9 is a view showing a mounting state in which the glass capillary 6 to which the signal light monomode optical fiber 7 of FIG. 7 has been fixed is fixed to an end face 1b of a z-cut LN substrate 1.

FIG. 5 is a top view for explanation of a state in which the signal light monomode optical fiber 7 is mounted in the second embodiment of the invention.

In FIG. 5, reference numeral 16 is a lens, 17 is a lens holder, reference numeral 18 is a ferrule, and 19 is a ferrule guide.

A point that the second embodiment of the invention is different from the first embodiment of the invention is in a point that the signal light monomode optical fiber 7 is not directly coupled to the end face 1b of the z-cut LN substrate 1.

Namely, the light propagating the output optical waveguide 2e is output into the air to propagate, and is coupled to the signal light monomode optical fiber 7 via the lens 16.

In this case, provided that $n_2=1$ is set in formula (5) shown in the first embodiment, an inclination $\theta_1$ of the output optical waveguide 2e and an inclination $\theta_0$ of the substrate end face 1b which are necessary for realizing the present invention can be found.

In the case of the second embodiment, a light is output from the end face 1b of the z-cut LN substrate 1 so as to be parallel to the side faces 1c and 1d of the z-cut LN substrate 1 (or the package case side faces 11a and 11b).

Therefore, when the light is coupled to the signal light monomode optical fiber 7, it is possible to place the lens 16 on the optical axis of the light output into the air from the substrate end face 1b, which results in less deterioration in coupling efficiency due to spherical aberration of the lens 16.

Further, because a light is output from the substrate end face 1b so as to be straight and parallel to the package case side faces 11a and 11b, the light does not propagate at a slant in the package case 11, and the package case 11 can be made compact.

Moreover, in the second embodiment of the invention, the z-cut LN substrate 1 can be installed such that the side faces thereof are made parallel to the side faces 11a and 11b of the package case 11. For this reason, from this viewpoint as well, there is the excellent advantage that the package case 11 can be made compact.

The above descriptions relate to the case where a light is emitted from the output optical waveguide 2e to the signal light monomode optical fiber 7 of an LN optical modulator or the like to which the waveguide type optical device of the invention is applied.

On the other hand, at the other substrate end face 1a of an LN optical modulator or the like to which the waveguide type optical device of the invention is applied, a light is input to the input optical waveguide 2a (refer to FIG. 1).

The descriptions of the output optical waveguide 2e up to now can be applied to the substrate end face 1a at the side of the input optical waveguide 2a as well. Further, it is possible in the same light to input a light parallel to the side faces 1c and 1d of the z-cut LN substrate 1 (or the package case side faces 11a and 11b) into the input optical waveguide 2a.

Note that it goes without saying that the present invention can be applied to a case of a waveguide type optical device having only one of an input optical waveguide and an output optical waveguide as well.

Further, it is assumed that the side faces 1c and 1d of the z-cut LN substrate 1 are parallel to the side faces 11a and 11b of the package case 11. However, in the invention, the relationship between an inclined angle of the optical waveguide head for the end faces 1a and 1b of the z-cut LN substrate 1 and an inclined angle of the substrate end faces 1a and 1b is important, and the side faces 1c and 1d of the z-cut LN substrate 1 may not be necessarily parallel to the side faces 11a and 11b of the package case 11.

Note that, in a case where the both of the side faces 1c and 1d of the z-cut LN substrate 1 and the side faces 11a and 11b of the package case 11 are not in a parallel relationship, it is structured such that a light is parallel to the package case side faces 11a and 11b, which is advantageous and convenient for mounting.

Note that, with respect to a degree of parallelization of "parallel to the side faces 1c and 1d of the LN substrate (or the package case side faces 11a and 11b)" in descriptions as described above, this does not necessarily mean that proper parallelism is required. If it is substantially parallel thereto, there is no problem on implementing the present invention.

Further, it goes without saying that the present invention can be applied to a so-called window structure in which the input optical waveguide 2a and the output optical waveguide 2e are disconnected before reaching the substrate end faces 1a and 1b.

Note that, in the second embodiment, when the end face of the signal light monomode optical fiber 7 is cut at a slant for the purpose of preventing a return light, it is necessary to incline the light input to the light monomode optical fiber 7 so as to be brought in line with the optical axis thereof. However, even if the side faces 1c and 1d of the z-cut LN substrate 1 are installed so as to be parallel to the side faces 11a and 11b of the package case 11, this can be realized by setting the angle of the inclination of the output optical waveguide 2e.

Note that, the above descriptions have been described on the assumption that the shapes of the package case side faces 11a and 11b are even plane surfaces as shown in FIGS. 1 to 5. However, this is not limited thereto.

For example, it is sufficient if there is a plane surface or a portion serving as a reference on only a part of the side face, and it is sufficient if an angle of the optical waveguide on the substrate described above is set with respect to the part.

Note that, in all the embodiments of the invention, the signal light monomode optical fiber 7 is not fixed so as to be parallel to the side faces 1c and 1d of the z-cut LN substrate 1 (or the package case side faces 11a and 11b) (i.e., when it is not $\Delta\theta=0$ in FIG. 3). In this case, by setting the inclination $\theta_1$ of the input optical waveguide 2a or the output optical waveguide 2e particularly among an inclination $\theta_1$ of the input optical waveguide 2a or the output optical waveguide 2e and an inclination $\theta_0$ of the substrate end face 1b, to an appropriate angle, an absolute value of $\Delta\theta$ can be suppressed to be small as compared with a case where the inclination $\theta_1$ of the input optical waveguide 2a or the output optical waveguide 2e is 0, which results in significant improvement in manufacturing performance of the module.

Further, even when it is necessary to incline an incident light or an outgoing light at a desired angle, it is possible to carry out it by setting the inclination $\theta_1$ of the input optical waveguide 2a or the output optical waveguide 2e to an appropriate value.

Third Embodiment

FIG. 6 is a top view for explanation of a state in which the signal light monomode optical fiber 7 is mounted in the third embodiment of the invention.

In the present embodiment, when the tube portion 14 of the package case 11 is inclined, a light is emitted at a slant from the substrate end face 1b, so that the light emitted from the substrate end face 1b of the z-cut LN substrate 1 is efficiently coupled to the signal light monomode optical fiber 7 which is inclined in the same way as the tube portion 14.

Namely, in the third embodiment of the invention, the substrate end face 1b is substantially perpendicular to the side faces 1c and 1d of the z-cut LN substrate 1. However, because the output optical waveguide 2a forms an angle inclined to the substrate end face 1b, a light is emitted at a slant from the substrate end face 1b.

In the above description, although the outgoing side has been used as an example with respect to a light, it is obvious that the present invention can be applied to the incident side.

Further, the z-cut LN substrate has been explained as an LN substrate. However, various substrates such as an x-cut substrate, a y-cut LN substrate, and the like may be used.

Moreover, an LN substrate has been assumed as a substrate. However, the substrate may be other dielectric substrates such as lithium tantalate or the like, or moreover, may be a semiconductor substrate.

Further, it goes without saying that application of the waveguide type optical device of the invention can be used for, not only an optical modulator, but also other optical waveguide devices such as a plane light circuit (PLC) such as an array waveguide grid (AWG) filter or the like, and the like.

Then, in the invention which has been described based on the respective embodiments as described above, in addition to the basic structure (1.) described above, the following structures (2.) to (8.) are included.

(2.) The waveguide type optical device according to the basic structure (1.) further comprising a package case 11 into which the substrate 1 is to be housed, being characterized in that, in order for angles formed by at least one of a light input to the optical input end face 2f and a light output from the optical output end face 2g, and the substrate end faces 1c and 1d which are the ends at the short-side direction sides of the substrate 1 or the package case side faces 11a and 11b at the short-side direction sides of the package case 11 to be desired angles, angles formed by at least one of the input optical waveguide 2a structuring the optical input end face 2f and the output optical waveguide 2e structuring the optical output end face 2g, and the functional optical waveguides 2c-1 and 2c-2 are made different from 0, and angles formed to the substrate end faces 1a and 1b at the respective sides are made different from 90°.

(3.) The waveguide type optical device according to the basic structure (1.) or the structure (2.), further comprising the package case 11 into which the substrate 1 is to be housed, being characterized in that, in order for an absolute value of angles formed by at least one of a light input to the optical input end face 2f and a light output from the optical output end face 2g, and the substrate end faces 1c and 1d which are the ends at the short-side direction sides of the substrate 1 or the package case side faces 11a and 11b at the short-side direction sides of the package case 11 to be made smaller than an absolute value of angles formed by a light input to the optical input end face 2f or a light output from the optical output end face 2g, and the substrate end faces 1c and 1d which are the ends at the short-side direction sides of the substrate or the package case side faces 11a and 11b at the short-side direction sides of the package case 11 when it is assumed that at least one of the input optical waveguide 2a and the output optical waveguide 2e is parallel to the functional optical waveguides 2c-1 and 2c-2, angles formed by at least one of the input optical waveguide 2a and the output optical waveguide 2e, and the functional optical waveguides 2c-1 and 2c-2 are made different from 0, and angles formed to the substrate end faces 1a and 1b at the respective sides are made different from 90°.

(4.) The waveguide type optical device according to one of the basic structure (1.) and the structures (2.) and (3.), further comprising the package case 11 into which the substrate 1 is to be housed, being characterized in that, in order for a light input to the optical input end face 2f or a light output from the optical output end face 2g to be input or output in a direction parallel to the substrate end faces 1c and 1d which are the ends at the short-side direction sides of the substrate 1 or the package case side faces 11a and 11b at the short-side direction sides of the package case 11, angles formed by at least one of the input optical waveguide 2a and the output optical waveguide 2e, and the functional optical waveguides 2c-1 and 2c-2 are made different from 0, and angles formed to the substrate end faces 1a and 1b at the respective sides are made different from 90°.

(5.) The waveguide type optical device according to one of the basic structure (1.) and the structures (2.) to (4.), being characterized in that a monomode optical fiber (7) is provided in the vicinity of the optical input end face 2f or in the vicinity of the optical output end face 2e.

(6.) The waveguide type optical device according to the structure (2.), being characterized in that, given that an equivalent refractive index of the input optical waveguide 2a or the output optical waveguide 2e, or a refractive index of the substrate 1 is $n_1$, a refractive index or an equivalent refractive index of a medium which the input optical waveguide 2a or the output optical waveguide 2e contacts is $n_2$, an angle formed by the optical input end face 2f or the optical output end face 2g to the perpendicular line with respect to the substrate side faces 1c and 1d is $\theta_{OA}$, angles formed by the input optical waveguide 2a or the output optical waveguide 2e to the substrate side faces 1c and 1d are $\theta_{LA}$, and angles formed by a light incident into the input optical waveguide 2a or a light emitted from the output optical waveguide 2e to the functional optical waveguides 2c-1 and 2c-2 are $\Delta\theta$, and when the $\Delta\theta$ is given by $\Delta\theta=(\theta_{OA}-\theta_{LA})n_1/n_2-\theta_{OA}$, in order for angles formed by a light incident into the input optical waveguide 2a and the package case side faces 11a and 11b, or angles formed by a light output from the output optical waveguide 2e and the package case side faces 11a and 11b at the short-side direction sides to be desired angles, the $\theta_{LA}$ and the $(\theta_{OA}-\theta_{LA})$ are made different from 0.

(7.) The waveguide type optical device according to the structure (3.), being characterized in that, given that an equivalent refractive index of the input optical waveguide 2a or the output optical waveguide 2e, or a refractive index of the substrate 1 is $n_1$, a refractive index or an equivalent refractive index of a medium which the input optical waveguide 2a or the output optical waveguide 2e contacts is $n_2$, an angle formed by the optical input end face 2f or the optical output end face 2g to the perpendicular line with respect to the substrate side faces 1c and 1d is $\theta_{OA}$, an angle formed by the input optical waveguide 2a or the output optical waveguide 2e to the substrate side faces 1c and 1d is $\theta_{LA}$, and angles formed by a light incident to the input optical waveguide 2a or a light emitted from the output optical waveguide 2e to the functional optical waveguides 2c-1 and 2c-2 are $\Delta\theta$, and when the $\Delta\theta$ is given by $\Delta\theta=(\theta_{OA}-\theta_{1A})n_1/n_2-\theta_{OA}$, in order for an absolute value of the $\Delta\theta$ to be smaller than an absolute value of the $\Delta\theta$ in a case where a value of the $\theta_{1A}$ is made to be 0, the $\theta_{1A}$ is made different from 0.

(8.) The waveguide type optical device according to the structure (4.), being characterized in that, given that an equivalent refractive index of the input optical waveguide 2a or the output optical waveguide 2e, or a refractive index of the substrate 1 is $n_1$, a refractive index or an equivalent refractive index of a medium which the input optical waveguide 2a or the output optical waveguide 2e contacts is $n_2$, an angle formed by the optical input end face 2f or the optical output end face 2g to the perpendicular line with respect to the substrate side faces 1c and 1d is $\theta_{OA}$, an angle formed by the optical input end face 2f or the optical output end face 2g to the perpendicular line with respect to the package case side faces 11a and 11b is $\theta_{OB}$, angles formed by the input optical waveguide 2a or the output optical waveguide 2e to the substrate side faces 1c and 1d are $\theta_{1A}$, and angles formed by the input optical waveguide 2a or the output optical waveguide 2e to the package case side faces 11a and 11b are $\theta_{1B}$, the $n_1$, the $n_2$, the $\theta_{OA}$, and the $\theta_{1A}$ satisfy a relationship of $\theta_{OA}=n_1\theta_{1A}/(n_1-n_2)$, or the $n_1$, the $n_2$, the $\theta_{OB}$, and the $\theta_{1B}$ satisfy a relationship of $\theta_{OB}=n_1\theta_{1B}/(n_1-n_2)$.

Accordingly, in accordance with the invention as described above, the problems according to the prior art can be solved, and it is possible to provide a compact and low-loss waveguide type optical device by having a structure in which it is possible to easily carry out mounting including positioning work and fixing work of a signal light monomode optical fiber so as to include making an inclined angle of the monomode optical fiber small.

The invention claimed is:

1. A waveguide type optical device comprising:
   a substrate having an electro-optic effect and opposed end faces at ends of the substrate in a longitudinal direction and opposed side faces;
   an optical waveguide which is formed on the substrate and which includes:
      a plurality of functional optical waveguides, wherein light guided through the functional optical waveguides interacts with an applied electric signal;
      an optical input end face and an optical output end face which are provided at respective ones of the end faces of the substrate; and
      an input optical waveguide connecting the optical input end face and the functional optical waveguides, and an output optical waveguide connecting the optical output end face and the functional optical waveguides; and
   at least one of a signal light monomode optical fiber which has an end located opposite to the input optical waveguide at the optical input end face and which inputs light to the input optical waveguide, and a signal light monomode optical fiber which has an end located opposite to the output optical waveguide at the optical output end face and which receives light output from the output optical waveguide,
   wherein at least one of the input optical waveguide and the output optical waveguide is arranged to form an angle other than 0° with the functional optical waveguide connected thereto such that the at least one of the input optical waveguide and output optical waveguide is not coincident with the functional optical waveguide connected thereto, and
   wherein the at least one of the input optical waveguide and the output optical waveguide is arranged such that the at least one of the input optical waveguide and the output optical waveguide is not perpendicular to the corresponding one of the substrate end faces, and
   wherein the at least one of the input optical waveguide and the output optical waveguide is arranged such that the light input to or output from the at least one signal light monomode optical fiber is inclined at a desired angle with respect to the corresponding side face of the substrate.

2. The waveguide type optical device according to claim 1, wherein the signal light monomode optical fiber is arranged in a vicinity of one of the optical input end face and the optical output end face.

3. The waveguide type optical device according to claim 1, wherein the at least one of the input optical waveguide and the output optical waveguide is arranged such that the light input to or output from the signal light monomode optical fiber is input in a direction parallel to the side faces of the substrate.

4. The waveguide type optical device according to claim 1, wherein the signal light monomode optical fiber is attached to one of the side faces of the substrate such that the signal light monomode optical fiber has a portion adjoining the attached side face which is parallel to the side faces of the substrate.

5. The waveguide type optical device according to claim 1, wherein both the input optical waveguide and the output optical waveguide are arranged to form an angle other than 0° with the functional optical waveguides connected thereto such that the input optical waveguide and output optical waveguide are not coincident with the functional optical waveguides connected thereto.

6. A waveguide type optical device comprising:
   a substrate having an electro-optic effect and opposed end faces at ends of the substrate in a longitudinal direction and opposed side faces;
   an optical waveguide which is formed on the substrate and which includes:
      a plurality of functional optical waveguides, wherein light guided through the functional optical waveguides interacts with an applied electric signal;
      an optical input end face and an optical output end face which are provided at respective ones of the end faces of the substrate; and
      an input optical waveguide connecting the optical input end face and the functional optical waveguides, and an output optical waveguide connecting the optical output end face and the functional optical waveguides;
   at least one of a signal light monomode optical fiber which has an end located opposite to the input optical waveguide at the optical input end face and which inputs light to the input optical waveguide, and a signal light monomode optical fiber which has an end located opposite to the output optical waveguide at the optical output end face and which receives light output from the output optical waveguide; and
   a package case in which the substrate is housed and having opposed side faces,
   wherein at least one of the input optical waveguide and the output optical waveguide is arranged to form an angle other than 0° with the functional optical waveguide connected thereto such that the at least one of the input optical waveguide and output optical waveguide is not coincident with the functional optical waveguide connected thereto, and wherein the at least one of the input optical waveguide and the output optical waveguide is arranged such that the at least one of the input optical waveguide and the output optical waveguide is not perpendicular to the corresponding one of the substrate end faces, and wherein the at least one of the input optical waveguide and the output optical waveguide is arranged such that the light input to or output from the at least one signal light monomode optical fiber is inclined at a desired angle with respect to at least one of the side face of the substrate and the side face of the package case.

7. The waveguide type optical device according to claim 6, wherein at least one of the input optical waveguide and the output optical wave guide is arranged such that angles formed by the at least one of the input optical waveguide and the output optical waveguide with the functional optical waveguide connected thereto are different from 0°, and angles formed to the substrate end faces at the respective sides of the substrate are different from 90°.

8. The waveguide type optical device according to claim 7, wherein the at least one of the input optical waveguide and the output optical wave guide is arranged such that an absolute value of angles formed by light input to the optical input end face and light output from the optical output end face, and the substrate said faces or the package case side faces is smaller than an absolute value of angles formed by light input to the optical input end face or light output from the optical output end face, and the substrate side faces or the package case side faces when the at least one of the input optical waveguide and the output optical waveguide is parallel to the functional optical waveguide connected thereto.

9. The waveguide type optical device according to claim 8, wherein the at least one of the input optical waveguide and the output optical wave guide is arranged such that light input to the optical input end face or light output from the optical output end face is input or output in a direction parallel to the substrate side faces.

10. The waveguide type optical device according to claim 9, wherein the input optical waveguide, the output optical waveguide and the package ease are formed such that $n_1$, $n_2$, $\theta_{OA}$, and $\theta_{1A}$ satisfy a relationship of $\theta_{OA}=n_1\theta_{1A}/(n_1-n_2)$ or $n_1$, $n_2$, $\theta_{OB}$, and $\theta_{1B}$ satisfy a relationship of $\theta_{OB}=n_1\theta_{1B}/(n_1-n_2)$, and $\theta_{OA}$ is an angle formed by the optical input end face or the optical output end face to the perpendicular line with respect to the substrate side faces, $\theta_{OB}$ is an angle formed by the optical input end face or the optical output end face to the perpendicular line with respect to the package case side faces, $\theta_{1A}$ are angles formed by the input optical waveguide or the output optical waveguide to the substrate side faces, $\theta_{1B}$ are angles formed by the input optical waveguide or the output optical waveguide to the package case side faces, and $n_1$ is an equivalent refractive index of the input optical waveguide or the output optical waveguide, or a refractive index of the substrate and $n_2$ is a refractive index or an equivalent refractive index of a medium which the input optical waveguide or the output optical waveguide contacts.

11. The waveguide type optical device according to claim 9, wherein the signal light monomode optical fiber is arranged in a vicinity of one of the optical input end face and the optical output end face.

12. The waveguide type optical device according to claim 7, wherein the input optical waveguide, the output optical waveguide and the package case are formed such that $\theta_{1A}$ is different from 0° such that an absolute value of $\Delta\theta$ is smaller than an absolute value of $\Delta\theta$ when $\theta_{1A}$ is 0°, and $\theta_{OA}$ is an angle formed by the optical input end face or the optical output end face to the perpendicular line with respect to the substrate side faces, $\theta_{1A}$, are angles formed by the input optical waveguide or the output optical waveguide to the substrate side faces, and $\Delta\theta$ are angles formed by a light incident into the input optical waveguide or a light emitted from the output optical waveguide to the functional optical waveguides when $\Delta\theta=(\theta_{OA}-\theta_{1A})n_1/n_2\theta_{OA}$, and $n_1$ is an equivalent refractive index of the input optical waveguide or the output optical waveguide, or a refractive index of the substrate and $n_2$ is a refractive index or an equivalent refractive index of a medium which the input optical waveguide or the output optical waveguide contacts.

13. The waveguide type optical device according to claim 7, wherein the at least one of the input optical waveguide and the output optical wave guide is arranged such that an absolute value of angles formed by at least one of light input to the optical input end face and light output from the optical output end face, and the substrate side faces or the package case side faces are smaller than an absolute value of angles formed by light input to the optical input end face or light output from the optical output end face, and the substrate side faces or the package case side faces when at least one of the input optical waveguide and the output optical waveguide is parallel to the functional optical waveguides.

14. The waveguide type optical device according to claim 7, wherein the at least one of the input optical waveguide and the output optical wave guide is arranged such that light input to the optical input end face or light output from the optical output end face is input or output in a direction parallel to the substrate side faces.

15. The waveguide type optical device according to claim 7, wherein the signal light monomode optical fiber is arranged in a vicinity of one of the optical input end face and the optical output end face.

16. The waveguide type optical device according to claim 6, wherein the input optical waveguide, the output optical waveguide and the package case are formed such that angles formed by light incident into the input optical waveguide and the package case side faces, or angles formed by light output from the output optical waveguide and the package case side faces are at desired angles $\theta_{1A}$ and $(\theta_{OA}-\theta_{1A})$ which are different from 0°, and $\theta_{OA}$ is an angle formed by the optical input end face or the optical output end face to the perpendicular line with respect to the substrate side faces, $\theta_{1A}$ are angles formed by the input optical waveguide or the output optical waveguide to the substrate side faces, and $\Delta\theta$ are angles formed by a light incident into the input optical waveguide or light emitted from the output optical waveguide to the functional optical waveguides when $\Delta\theta=(\theta_{0A}-\theta_{1A})n_1/n_2\theta_{0A}$, and $n_1$ is an equivalent refractive index of the input optical waveguide or the output optical waveguide, or a refractive index of the substrate and $n_2$ is a refractive index or an equivalent refractive index of a medium which the input optical waveguide or the output optical waveguide contacts.

17. The waveguide type optical device according to claim 6, wherein the at least one of the input optical waveguide and the output optical wave guide is arranged such that light input to the optical input end face or light output from the optical output end face is input or output in a direction parallel to the substrate side faces or the package case side faces.

18. The waveguide type optical device according to claim 6, wherein the signal light monomode optical fiber is arranged in a vicinity of one of the optical input end face and the optical output end face.

19. The waveguide type optical device according to claim 6, wherein the at least one of the input optical waveguide and the output optical waveguide is arranged such that the light input to or output from the signal light monomode optical fiber is input in a direction parallel to the side faces of the substrate or to the side faces of the package case.

20. The waveguide type optical device according to claim 6, wherein the signal light monomode optical fiber is attached to one of the side faces of the substrate such that the signal light monomode optical fiber has a portion adjoining the attached side face which is parallel to the at least one of the side faces of the substrate and the side faces of the package case.

21. The waveguide type optical device according to claim 6, wherein both the input optical waveguide and the output optical waveguide are arranged to form an angle other than 0° with the functional optical waveguides connected thereto such that the input optical waveguide and output optical waveguide are not coincident with the functional optical waveguides connected thereto.

* * * * *